(12) United States Patent
Atsuta et al.

(10) Patent No.: US 9,353,809 B2
(45) Date of Patent: May 31, 2016

(54) VEHICLE DISC BRAKE

(71) Applicant: NISSIN KOGYO CO., LTD., Ueda, Nagano (JP)

(72) Inventors: Daiki Atsuta, Nagano (JP); Yuki Urashima, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/618,390

(22) Filed: Feb. 10, 2015

(65) Prior Publication Data
US 2015/0226275 A1    Aug. 13, 2015

(30) Foreign Application Priority Data

Feb. 12, 2014  (JP) ................................ 2014-023988

(51) Int. Cl.
| F16D 55/00 | (2006.01) |
| F16D 55/2265 | (2006.01) |
| F16D 65/00 | (2006.01) |
| F16D 121/02 | (2012.01) |

(52) U.S. Cl.
CPC ........ F16D 55/2265 (2013.01); F16D 65/0087 (2013.01); F16D 2055/0008 (2013.01); F16D 2121/02 (2013.01)

(58) Field of Classification Search
CPC ............ F16D 65/0068; F16D 55/2265; F16D 2055/0016
See application file for complete search history.

(56) References Cited

U.S. PATENT DOCUMENTS

| 6,286,636 B1* | 9/2001 | Iwata | F16D 65/0978 188/73.31 |
| 2004/0195057 A1* | 10/2004 | Ooshima | F16D 65/0972 188/73.38 |
| 2007/0251772 A1* | 11/2007 | Tsurumi | F16D 65/095 188/73.38 |
| 2013/0133990 A1* | 5/2013 | Suzuki | B60T 1/065 188/72.4 |
| 2015/0233438 A1* | 8/2015 | Atsuta | F16D 65/0068 188/73.31 |

FOREIGN PATENT DOCUMENTS

JP    2009216163    9/2009

* cited by examiner

*Primary Examiner* — Christopher Schwartz
(74) *Attorney, Agent, or Firm* — Andrew M. Calderon; Roberts Mlotkowski Safran & Cole, P.C.

(57) ABSTRACT

One embodiment provides a vehicle disc brake, including a caliper body, a caliper bracket, a pair of friction pads and pad retainers. Lengths of a part of reacting claws of the caliper body are set so that distal end portions thereof are disposed further radially outwards in a radial direction of a disc brake rotor than inward pieces of retainer portions of pad retainers. And, distal end portions of the inward pieces are brought into abutment with lug pieces of the friction pads in a position which lies further inwards of the caliper body than circumferential end faces of these reacting claws.

20 Claims, 6 Drawing Sheets

VEHICLE DISC BRAKE

CROSS-REFERENCE TO RELATED APPLICATION(S)

This application claims priority from Japanese Patent Application No. 2014-023988 filed on Feb. 12, 2014, the entire contents of which are incorporated herein by reference.

FIELD

An embodiment described herein generally relates to a vehicle disc brake for use on a vehicle such as a motor vehicle or a motorcycle and more particularly to a pin-sliding type vehicle disc brake in which lug pieces of friction pads are movably supported in pad guide grooves formed in caliper support arms via pad retainers.

BACKGROUND

In a pin-sliding type vehicle disc brake, lug pieces which are provided at both end portions of backing plates of friction pads are supported movably in pad guide grooves which are formed to lie opposite to each other in caliper support arms of a caliper bracket so that the friction pads are supported so as to move in an axial direction of a disc brake rotor, in general, pad retainers formed of a thin sheet of metal are interposed between the pad guide grooves and the lug pieces.

Such pad retainer may include a pair of retainer portions each including an outward piece which is disposed along a surface of the pad guide groove which lies radially outwards in relation to a radial direction of the disc brake rotor or a radially outward surface, a deep-side piece which is disposed along an opposing surface of the pad guide groove and an inward piece which extends inwards of the caliper body from an end portion of the deep-side piece which lies radially inwards in relation to the radial direction of the disc brake rotor or radially inward end portion, and a connecting piece which stretches over an outer edge of the disc brake rotor to connect the pair of retainer portions (for example, refer to JP-2009-216163-A).

For example, in the pin-sliding type vehicle disc brake of JP-2009-216163-A, since the inward pieces of the pad retainers are disposed near the reacting claws provided on the reacting portion of the caliper body, when attempting to reduce a circumferential length of the rotor of the disc brake, the inwards pieces may interfere with the reacting claws, constricting the reduction of the size of the disc brake.

SUMMARY

One object of the present invention is to provide a vehicle disc brake which can realize a reduction in size as a pin-sliding type vehicle disc brake in which lug pieces of friction pads are movably supported in pad guide grooves in caliper support arms via pad retainers.

The present invention provides following inventive Aspects 1 to 4. Numerals etc. in the brackets indicate exemplary correspondence with the reference sings used in the embodiment.

1. A vehicle disc brake (1), including:
    a caliper body (5) including
        an acting portion (5a) disposed on one side of a disc brake rotor (2), the acting portion (5a) having a cylinder bore (5d, 5e) in which a piston (7a, 7b) is accommodated,
        a reacting portion (5b) disposed on the other side of the disc brake rotor (2), the reacting portion (5b) having a plurality of reacting claws (5g, 5h, 5g), and
        a bridge portion (5c) connecting the acting portion (5a) and the reacting portion (5b);
    a caliper bracket (3) to be fixedly connected to a vehicle body, the caliper bracket (3) including
        a pair of caliper support arms (3a) disposed to stride over an outer edge of the disc brake rotor (2) and to movably support the caliper body (5) via slide pins (4) the axial direction of the disc brake rotor, and
        pad guide grooves (3c) provided individually on the caliper support arms (3a) so as to face each other, each pad guide groove (3c) including
            a confronting surface (3f) which confronts a confronting surface (3f) of the other pad guide groove (3c) and
            a radially inward surface (3e) projecting from an inward end of the confronting surface (3f) in a radial direction of the disc rotor (2) in a direction which is at right angles to the confronting surface (3f);
    a pair of friction pads (6) disposed to hold the disc brake (2) rotor therebetween and movably supported in the pad guide grooves (3c), each friction pad (6) including
        a backing plate (6a), and
        lug pieces (6b) provided at both end portions of the backing plate (6a); and
    pad retainers (10) individually interposed between friction pads (6) and the pad guide grooves (3c), each pad retainer (10) including
        a pair of retainer positions (10a) including
            a deep-side piece (10e) disposed along the confronting surface (3f) and
            inward pieces (10f) extending inwards of the caliper body (5) from an inward end portions of the deep-side pieces (10e) in the radial direction of the disc brake rotor (2), and
        a connecting piece (10c) which connects the retainer portions (10a) together,
        wherein lengths of the reacting claws (5g) which lie closest to the inward pieces (10f) are set so that distal end portions thereof are disposed further radially outwards in the radial direction of the disc brake rotor than the inward pieces (10f), and
        wherein the distal end portions of the inward pieces (10f) are brought into abutment with the lug pieces (6b) in a position which lies further inwards of the caliper body (5) than circumferential end faces (5j) of the reacting claws (5) which lies closest to the inward pieces (10f).

2. The vehicle disc brake (1) of Aspect 1,
    wherein the pad guide groove (3c) is formed into a U-like shape and further includes an outward surface (3d) in the radial direction of the disc brake rotor (2),
    wherein the retainer portion (10a) further includes an outward piece (10d) disposed along the outward surface (3d), and
    wherein the inward piece (10f) is inclined gradually radially outwards in the radial direction of the disc brake rotor (2) from the deep-side piece (10e) towards a distal end portion thereof.

3. The vehicle disc brake (1) of Aspect 1,
    wherein the caliper body (5) includes a plurality of cylinder bores (5d, 5e) as the cylinder bore (5d, 5e), and
    wherein the reacting claw (5h) that is disposed between the cylinder bores (5d, 5e) extends further radially inwards in the radial direction of the disc brake rotor (2) than the reacting claws (5g, 5g) which lie closest to the inward pieces (10f, 10f).

4. The vehicle disc brake (1) of Aspect 1, wherein the backing plates (6a) of the friction pads (6) each includes projecting portions (6e) formed on both end portions the corresponding backing plate (6a) which are positioned radially inward in the radial direction of the disc brake rotor (2) and circumferentially outward in a rotating direction of the disc brake rotor (2), and wherein indicators (11) configured to inform of a worn condition of the friction pads (6a) are crimp fixed to the projecting portions (6e).

According to the vehicle disc brake of the invention, the reacting claws which lie close to the inward pieces of the pad retainers are formed to have the length which enables the distal end portions thereof to be disposed further radially outwards in relation to the radial direction of the disc brake rotor than the inward pieces, and therefore, the reacting claws will not interfere with the inward pieces of the pad retainers, thereby reducing the size of the vehicle disc brake.

The distal end portions of the inward pieces are brought into abutment with the lug pieces in the position which lies further inwards of the caliper body than the circumferential end faces of the reacting claws, whereby the movement of the lug pieces in the axial direction of the disc brake rotor can be guided by the retainer portions while realizing the reduction in size of the vehicle disc brake.

The inward piece of the pad retainer is formed so as to be gradually inclined radially outwards in relation to the radial direction of the disc brake rotor from the portion facing the deep-side piece towards the distal end portion, and therefore, the lug piece is pressed against the radially outward surface of the pad guide groove via the outboard piece of the pad retainer by the inward piece, thereby restricting the looseness of the friction pad.

The caliper body includes the plurality of cylinder bores, and the reacting claw which is disposed between the adjacent cylinder bores extends further radially inwards in relation to the radial direction of the disc brake rotor than the reacting claws which lie closest to the inward pieces of the pad retainers. Therefore, the rigidity of the side of the caliper body including the plurality of cylinder bores where the reacting portion is provided can be ensured, and the friction pads can be pressed well by the plurality of reacting claws.

The distal end portions of the reacting claws which lie closest to the inward pieces of the pad retainers are formed to have the length which enables the distal end portions to be disposed further radially outwards in relation to the radial direction of the disc brake rotor than the inward pieces, and therefore, the spaces to which the indicators informing of the worn condition of the friction pads are crimp fixed can be ensured at the radially inward portions of the end portions in the rotating direction of the disc brake rotor of the backing plates of the friction pads.

The friction pads can be commonly used not only between the inboard and outboard sides but also between the left-wheel-side and right-wheel-side caliper bodies, thereby reducing projection costs.

DETAILED DESCRIPTION

Figure 1:
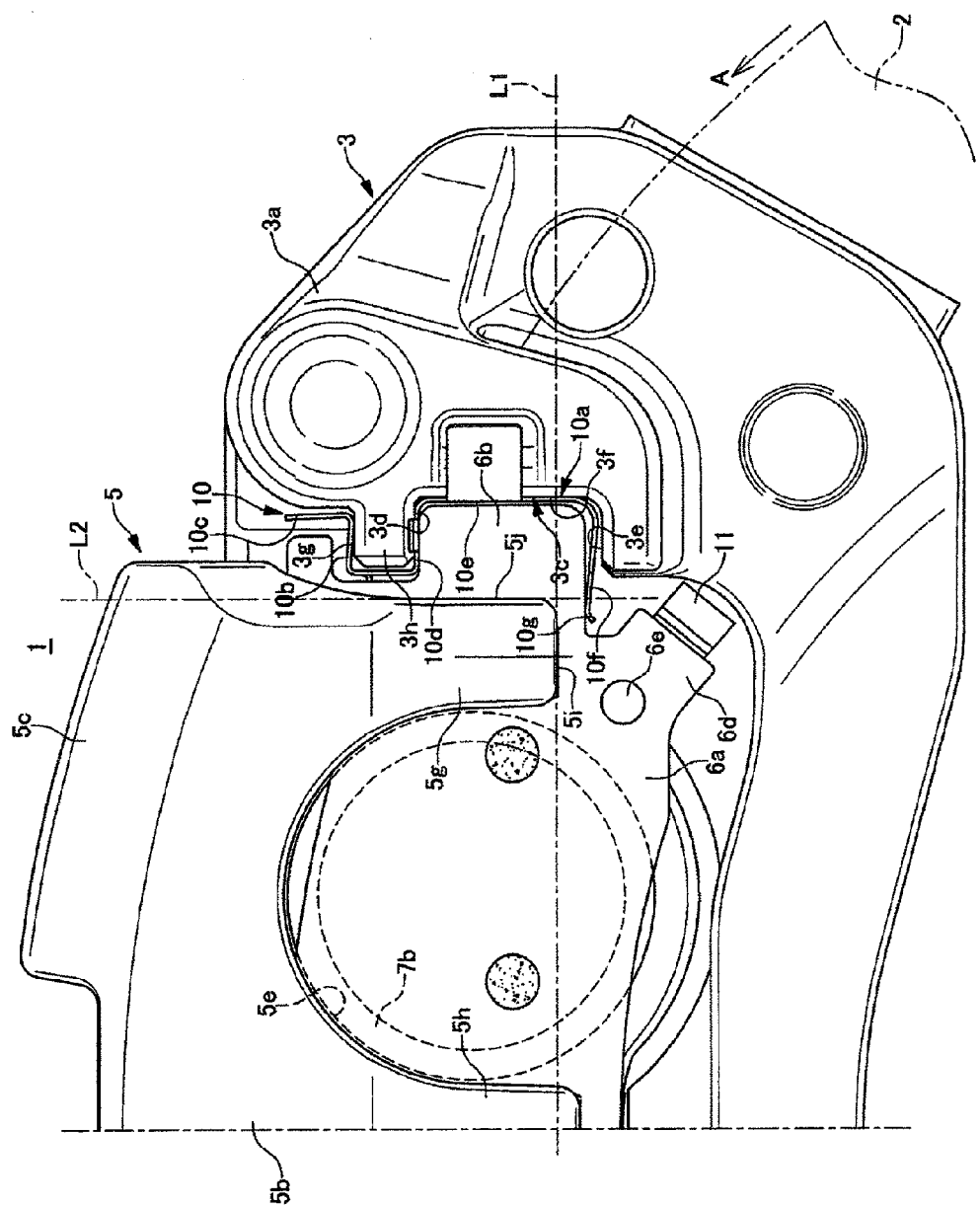
FIG. 1 is an enlarged view of a vehicle disc brake representing one embodiment.
Figure 2:
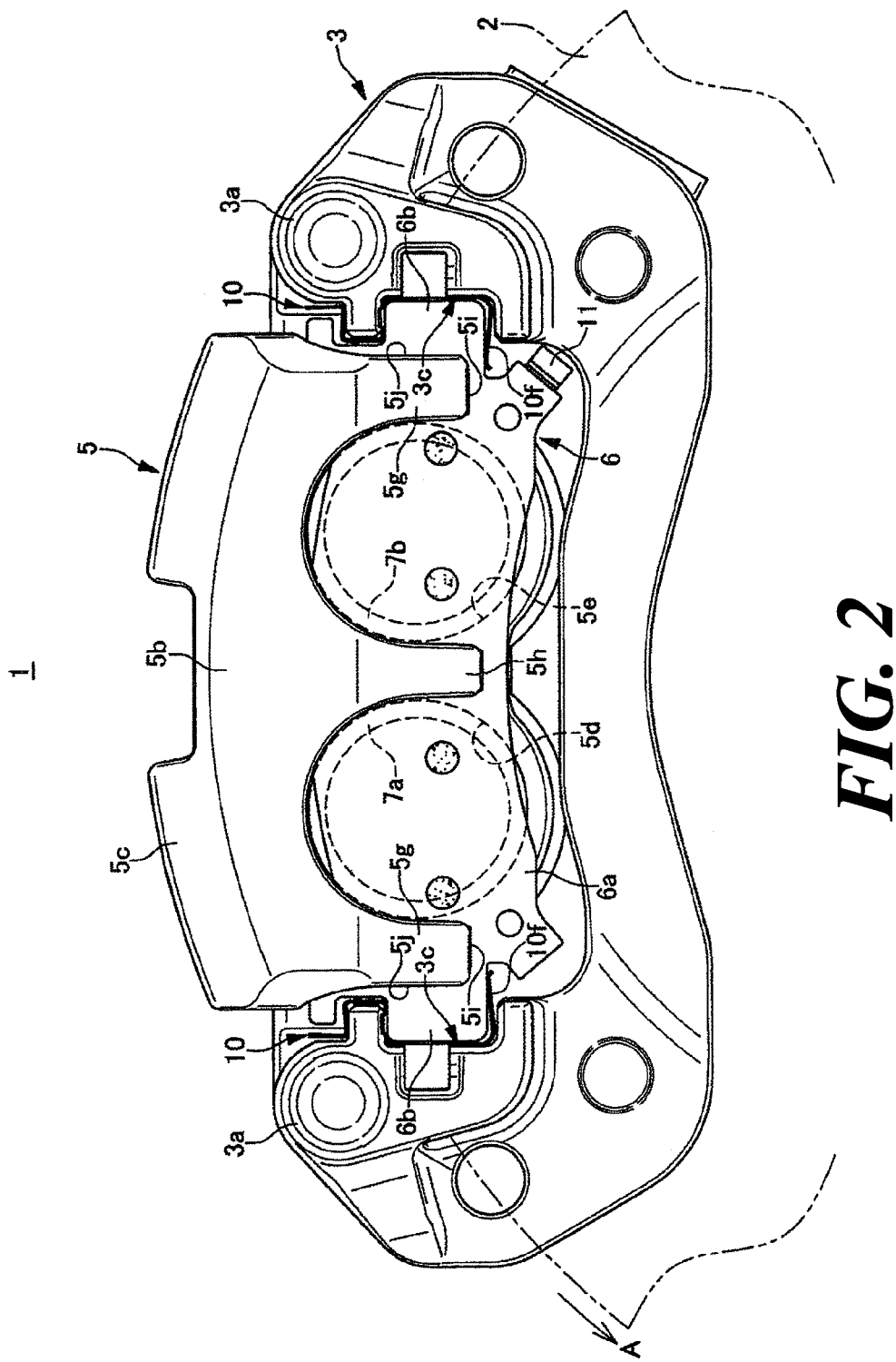
FIG. 2 is a rear view of the same vehicle disc brake.
Figure 3:
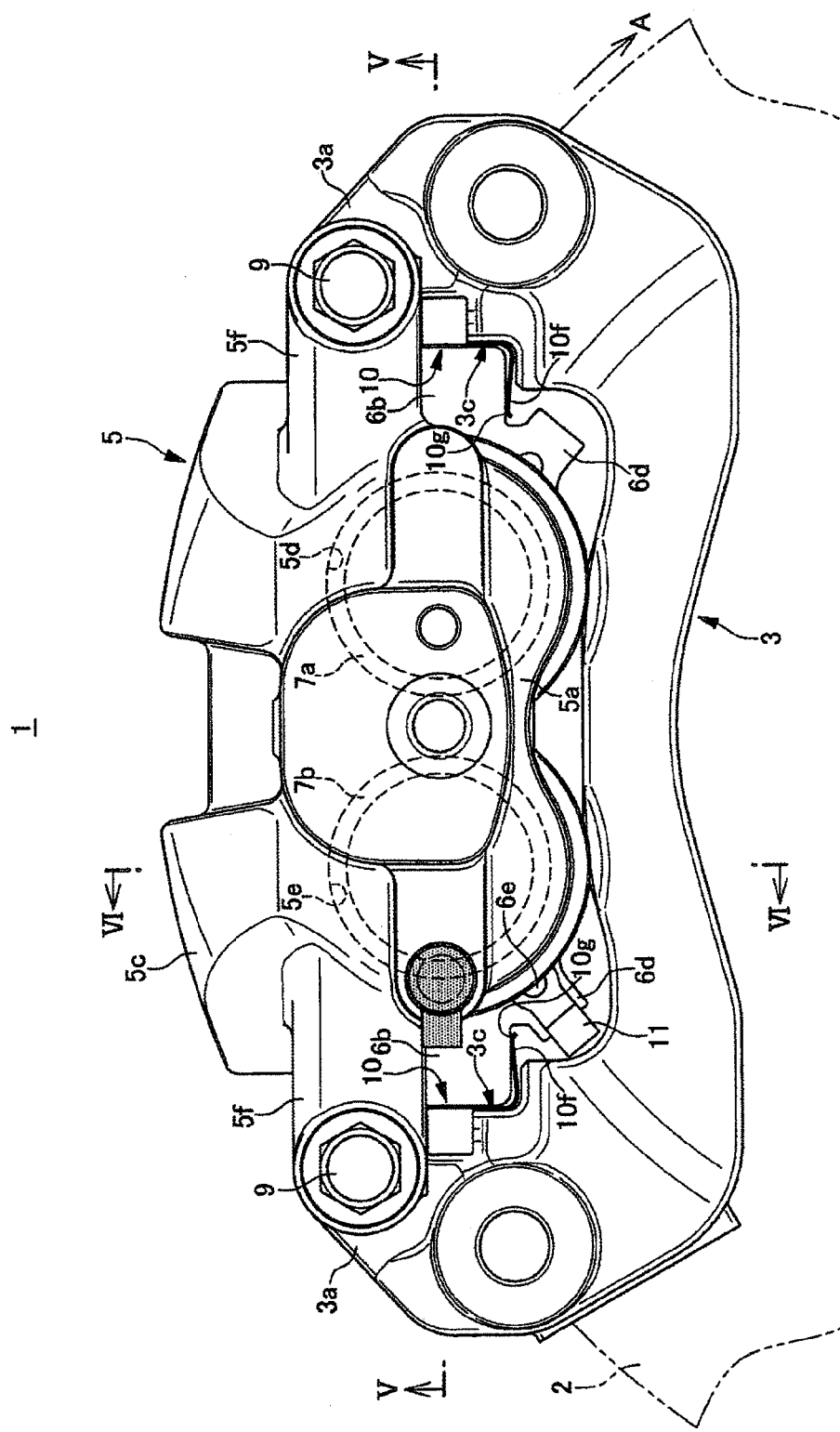
FIG. 3 is a front view of the same vehicle disc brake.
Figure 4:
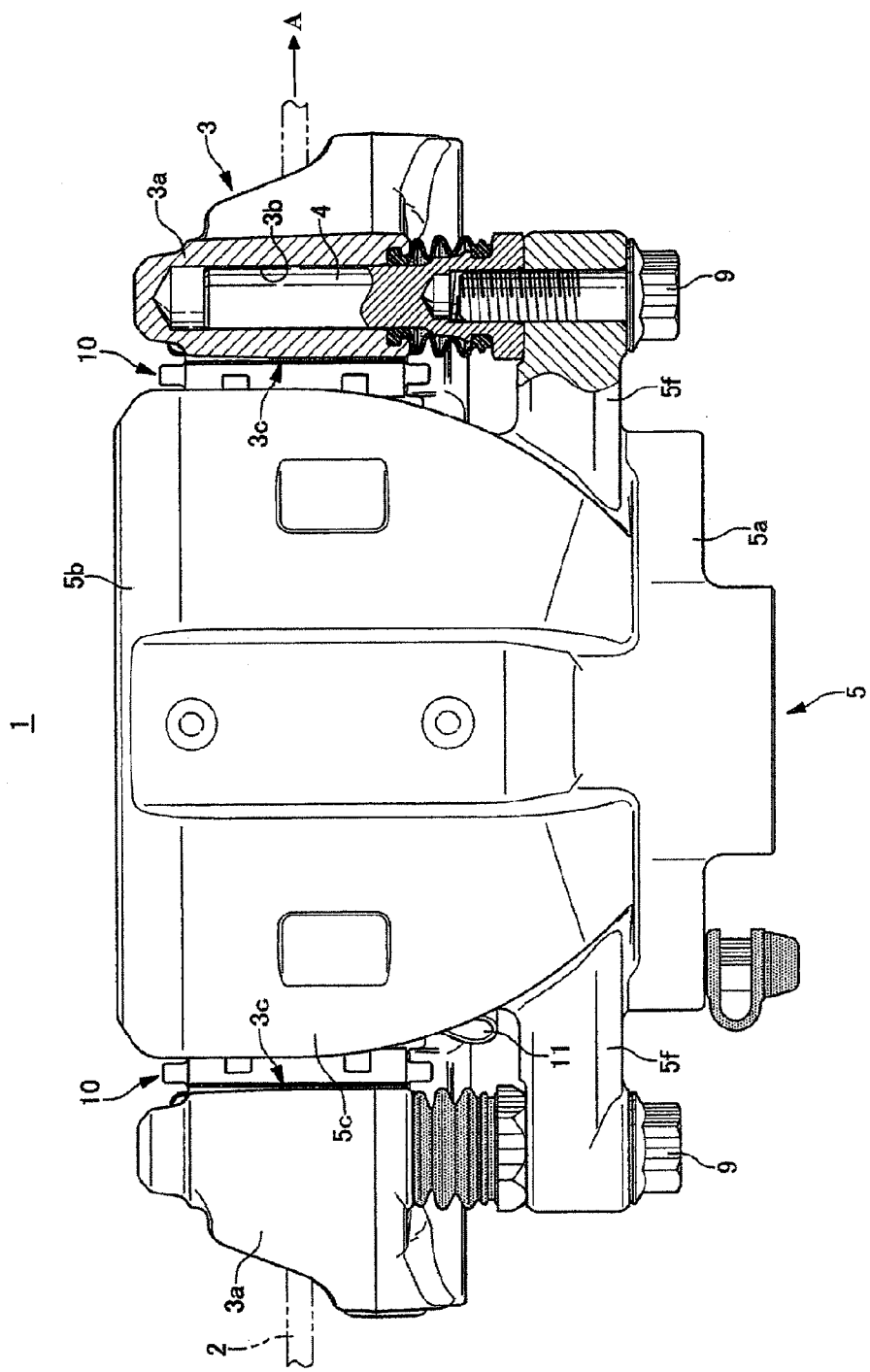
FIG. 4 is a partially sectional plan view of the same vehicle disc brake.
Figure 5:
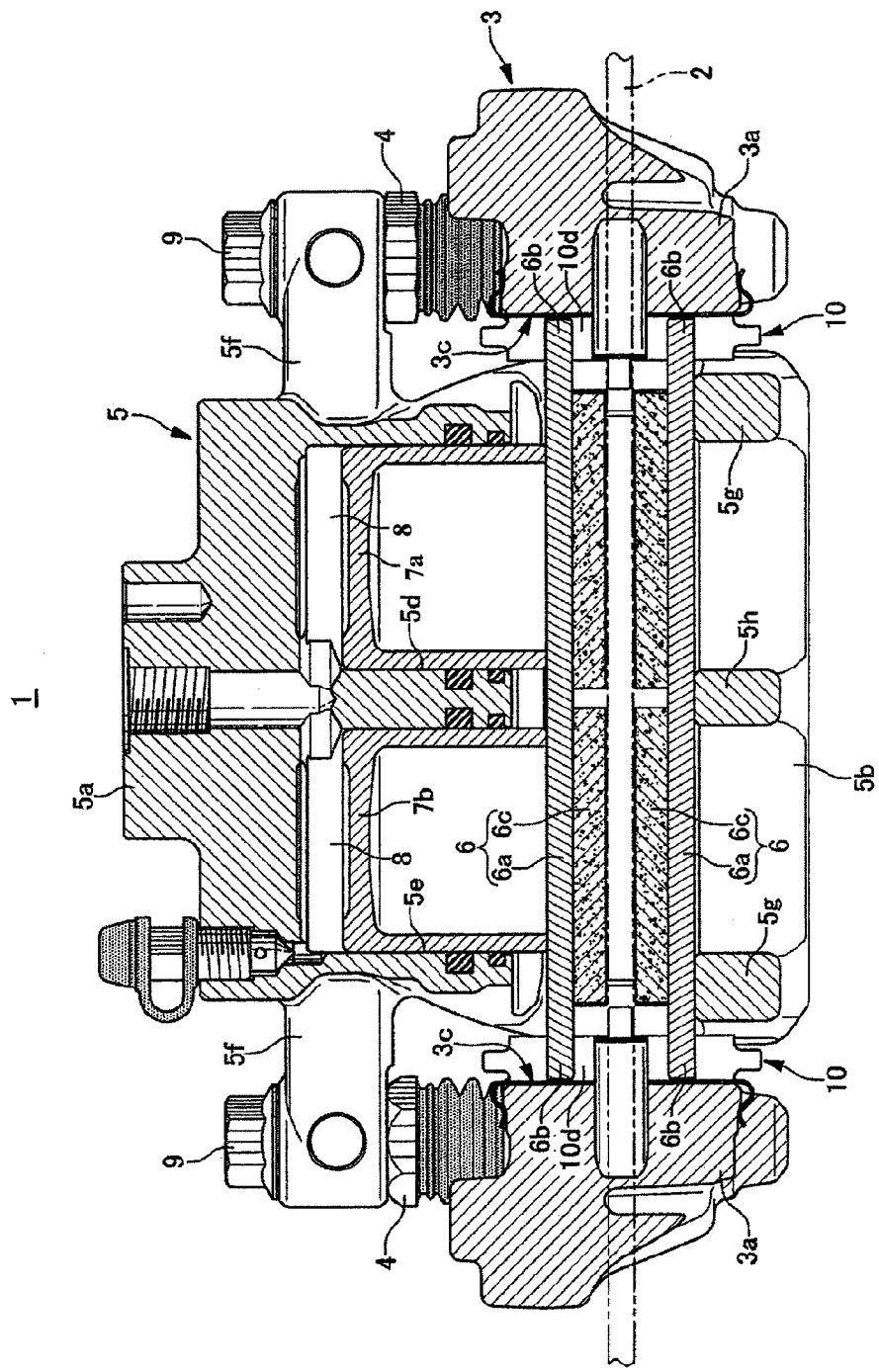
FIG. 5 is a sectional view taken along a line V-V in FIG. 3.
Figure 6:
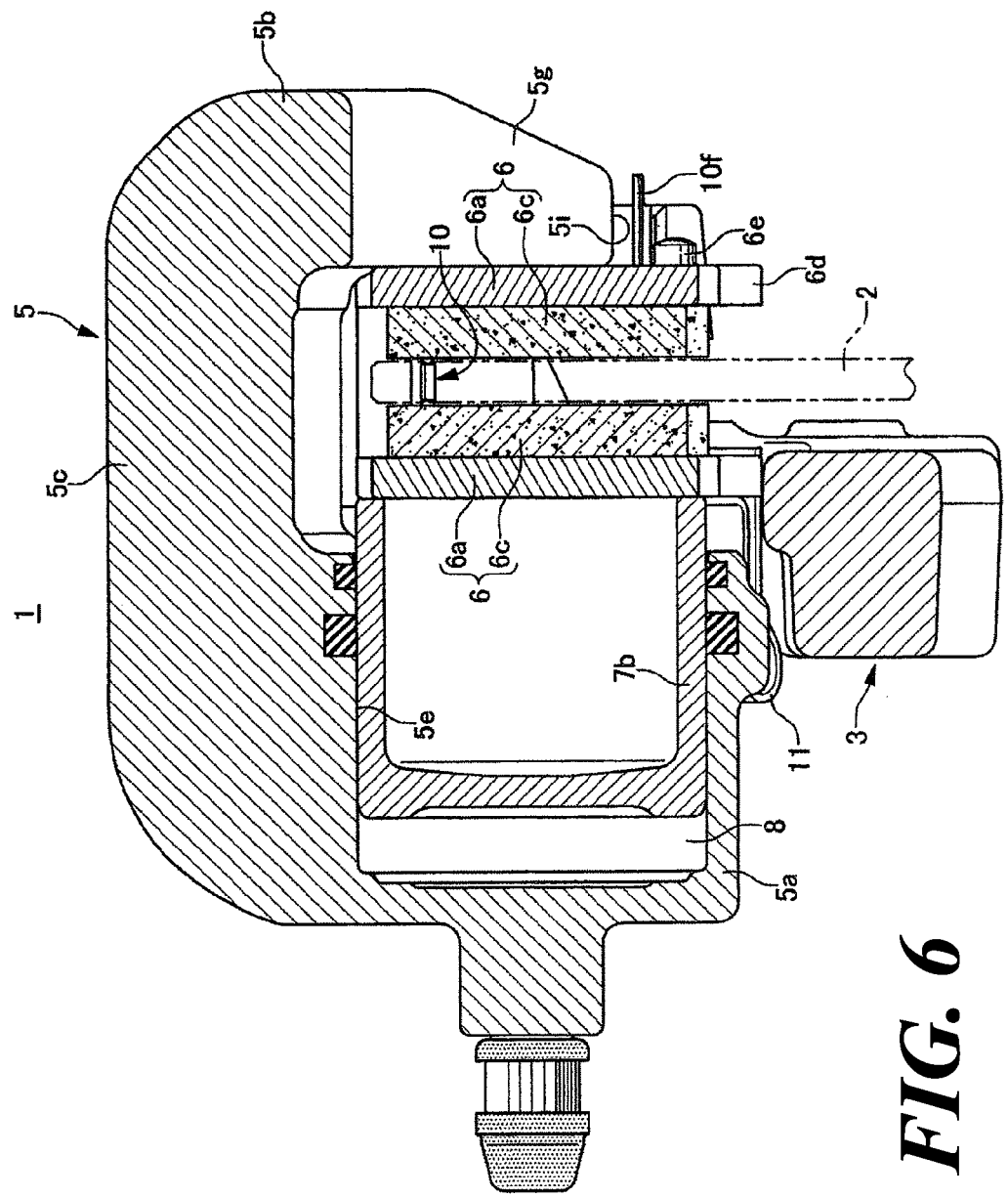
FIG. 6 is a sectional view taken along a line VI-VI in FIG. 3.

FIGS. 1 to 6 show one embodiment of a vehicle disc brake. An arrow A indicates a rotating direction of a disc brake rotor which rotates together with a wheel when a vehicle travels forwards. When referred to in the following description, a rotating rotor exit side and a rotating rotor entrance side are those resulting when the vehicle travels forwards.

A vehicle disc brake 1 of this embodiment includes a disc brake rotor 2 which rotates together with a wheel, a caliper bracket 3 which is secured to a vehicle body on one side portion of the disc brake rotor 2, a caliper body 5 which is supported by a caliper support arms 3a, 3a of the caliper bracket 3 via a pair of slide pins 4, 4 so as to move in an axial direction of the disc brake rotor, and a pair of friction pads 6, 6 which are disposed so as to face each other across the disc brake rotor 2.

The caliper body 5 includes an acting portion 5a and a reacting portion 5b which are provided on both sides of the disc brake rotor 2 and a bridge portion 5c which stretches over an outer edge of the disc brake rotor 2 to connect the acting and reacting portions together.

Two cylinder bores 5d, 5e are provided side by side in a circumferential direction of the disc brake rotor 2 in the acting portion 5a, and the cylinder bores 5d, 5e are opened at ends facing the disc brake rotor 2. Bottomed cylindrical pistons 7a, 7b are accommodated individually in the cylinder bores 5d, 5e, and the pistons 7a, 7b are designed to move in the direction of the disc brake rotor 2 in the cylinder bores 5d, 5e by means of hydraulic pressures which are supplied to hydraulic chambers 8, 8 at bottom portions of the cylinder bores 5d, 5e.

Vehicle body mounting arms 5f, 5f are provided individually at end portions of the acting portion 5a in relation to a rotating direction of the disc brake rotor 2 so as to project therefrom, and the slide pins 4 described above are provided at distal ends of the vehicle body mounting arms 5f via mounting bolts 9 so as to project therefrom.

The reacting portion 5b includes reacting claws 5g, 5g which are disposed at a rotating rotor exit side of the cylinder bore 5d which is disposed on a rotating rotor exit side and at a rotating rotor entrance side of the cylinder bore 5e which is disposed on a rotating rotor entrance side and a reacting claw 5h which is disposed between the cylinder bores 5d, 5e.

The caliper support arms 3a, 3a are shaped so that they extend from both end portions of the caliper bracket 3 in the rotating direction of the disc brake rotor 2 in the axial direction of the disc brake rotor 2 so as to stretch over the outer edge of the disc brake rotor 2 while holding both ends of the bridge portion 5c therebetween and extend towards the center of the disc brake rotor 2 along a side wall of the reacting portion 5b on the other side portion of the disc brake rotor 2.

A guide hole 3b which accommodates the slide pin 4 described above is formed in each caliper support arm 3a.

Four pad guide grooves 3c are provided in both the caliper support arms 3a, 3a which face each other on both the side portions of the disc brake rotor 2. Each pad guide groove 3c is formed into a U-like shape by having a surface 3d which lies radially outwards in relation to a radial direction of the disc brake rotor 2 or a radially outward surface 3d and a surface 3e which lies radially inwards in relation to the radial direction of the disc brake rotor 2 or a radially inward surface 3e, and a confronting surface 3f which connects the radially outward surface 3d and the radially inward surface 3e. Lug pieces 6b, 6b of each friction pad 6 which project from both end portions of backing plate 6a are supported movably in the pad guide grooves 3c, 3c on the rotating rotor entrance side and the rotating rotor exit side via pad retainers 10.

A pad retainer mounting portion 3h is provided at a side of each pad guide groove 3c which lies radially outwards in relation to the radial direction of the disc brake rotor 2 or a radially outer side, and this pad retainer mounting portion 3h has a mounting surface 3g which is oriented in parallel to the radially outward surface 3d.

In each friction pad 6, the lug pieces 6b, 6b, which are formed substantially rectangular so as to be inserted into the pad guide groove 3c, are provided at both the end portions of the backing plate 6a so as to project therefrom, and a lining 6c is affixed to one side surface of the backing plate 6a. A pair of mounting pieces 6d, 6d are formed at radially inward corner portions of the end portions of the backing plate 6a in the rotating direction of the disc brake rotor 2 so as to project therefrom while being inclined radially inwards in relation to the radial direction of the disc brake rotor 2.

Mounted on each of the mounting pieces 6d, 6d is an indicator 11 which is brought into sliding contact with the disc brake rotor 2 to emit a warning sound when the lining 6c gets worn to a wear limit. Projecting portions 6e, 6e are formed at proximal end portions of the mounting pieces 6d, 6d. The indicators 11 are crimped and fixed to the projecting portions 6e, 6e.

The pad retainer 10 includes a pair of retainer portions 10a, 10a which are installed in the pad guide grooves 3c,3c on both the sides of the disc brake rotor 2 at the rotating rotor entrance side or the rotating rotor exit side, mounting pieces 10b, 10b which are brought into abutment with the mounting surfaces 3g of the pad retainer mounting portions 3h, 3h of the caliper support arms 3a, and a connecting piece 10c which stretches over the outer edge of the disc brake rotor 2 to connect upper portions of the mounting pieces 10b, 10b.

Each retainer portion 10a includes an outward piece 10d which is disposed along the radially outward surface 3d of the pad guide groove 3c, a deep-side piece 10e which is disposed along the confronting surface 3f and an inward piece 10f which extends inwards of the caliper body 5 from a radially inward end portion of the deep-side piece 10e. The outward piece 10d and the deep-side piece 10e are connected to each other at right angles.

The inward piece 10f has a length which enables it to project further inwards of the caliper body 5 than the radially inward surface 3e of the pad guide groove 3c and is formed so that it is gradually inclined radially outwards in relation to the radial direction of the disc brake rotor 2 from an end portion thereof which faces the deep-side piece 10e towards a distal end portion 10g. The mounting piece 10b is formed so as to be elastically deformed by being bent back from a distal end portion of the outward piece 10d along a distal end face of the pad retainer mounting portion 3h and then being allowed to extend in the direction of the radially outward surface of the pad retainer mounting portion 3h. Then, the pad retainer mounting portion 3h is designed to be held by the mounting piece 10b which is elastically deformed outwards and the outward piece 10d.

The pad retainer 10 which is formed in the way described above is mounted on the caliper support arm 3a by the mounting piece 10b and the outward piece 10d being fitted onto the pad retainer mounting portion 3h.

By mounting the pad retainer 10 in that way, the pad retainer 10 is installed in such a state that the outward piece 10d of each retainer portion 10a is in abutment with the radially outward surface 3d of each pad guide groove 3c and a proximal end portion of each inward piece 10f is in abutment with a deep side of the radially inward surface 3e of each pad guide groove 3c.

In each friction pad 6, the indicator 11 is crimp fixed to the projecting portion 6e at the rotating rotor exit side, and the lug pieces 6b, 6b are inserted into the pad guide grooves 3c, 3c at the rotating rotor entrance side and exit side. Then, radially outward surfaces of the lug pieces 6b, 6b are brought into abutment with the outward pieces 10d, 10d of the retainer portions 10a, 10a, and radially inward surfaces of the lug pieces 6b, 6b are brought into abutment with the inward pieces 10f, 10f. Distal end sides of the inward pieces 10f, 10f are brought into abutment with the radially inward surfaces of the lug pieces 6b, 6b to thereby press the lug pieces 6b, 6b against the radially outward surfaces 3d, 3d of the pad guide grooves 3c, 3c via the outward pieces 10d, 10d.

The reacting claws 5g, 5g are formed to have a length which enables distal end portions 5i, 5i thereof are disposed further radially outwards in relation to the radial direction of the disc brake rotor 2 than the inward pieces 10f, 10f in such a state that the pad retainers 10 and the friction pads 6, 6 are assembled to the pad guide grooves 3c, 3c in the way described above and that the caliper body 5 is assembled to the caliper bracket 3.

The reacting claw 5h which is disposed between the cylinder bores 5d, 5e is formed to have a length which enables the reacting claw 5h to extend further radially inwards in relation to the radial direction of the disc brake rotor 2 than the reacting claws 5g, 5g which are disposed at the rotating rotor exit side and the rotating rotor entrance side. A straight line L1 which connects the distal end portions 5i, 5i is disposed further radially outwards in relation to the radial direction of the disc brake rotor 2 than the inward pieces 10f, 10f.

The inward pieces 10f, 10f of the pad retainer 10 are formed to have a length which enables the distal end portions 10g, 10g to be brought into abutment with the lug pieces 6b, 6b in a position which lies further inwards of the caliper body 5 than circumferential end faces 5j, 5j of the reacting claws 5g, 5g. The distal end portion 10g is brought into abutment with the lug piece 6b in a position which lies further inwards of the caliper body 5 than an extension L2 of the circumferential end face 5j.

The projecting portions 6e, 6e to which the indicators 11 are crimp fixed are individually disposed further radially inwards in relation to the radial direction of the disc brake rotor 2 than the distal end portions 5i, 5i of the reacting claws 5g, 5g.

In the vehicle disc brake 1 which is configured in the way described heretofore, when the working fluid under pressure is supplied to the hydraulic chambers 8 as a result of the brakes being applied, the pistons 7a, 7b are moved towards the opening portion side of the cylinder bores to thereby push the acting portion side friction pad 6 towards the disc brake rotor 2, whereby the lining 6c of the friction pad 6 is pressed against one side surface of the disc brake rotor 2.

A reaction force of the force acting in that way causes the caliper body 5 to move in the direction of the acting portion while being guided by the slide pins 4, 4, whereby the reacting claws 5g, 5g, 5h push the reacting force side friction pad 6 towards the disc brake rotor 2, which presses the lining 6c of the friction pad 6 against the other side surface of the disc brake rotor 2.

As described heretofore, according to this embodiment, the reacting claws 5g which lie close to the inward pieces 10f are formed to have the length which enables the distal end portions 5i thereof to be disposed further radially outwards than the inward pieces 10f, and therefore, the reacting claws 5g, 5g will not interfere with the inward pieces 10f, 10f of the pad retainer 10, thereby reducing the size of the vehicle disc brake 1.

The distal end portions 10g of the inward pieces 10f are brought into abutment with the lug pieces 6b in the position which lies further inwards of the caliper body 5 than the circumferential end faces of the reacting claws 5g, whereby the movement of the lug pieces 6b in the axial direction of the disc brake rotor 2 can be guided by the retainer portions 10a while realizing the reduction in size of the vehicle disc brake 1.

The reacting claw 5h which is disposed between the cylinder bores 5d, 5e is formed to have the length which enables the reacting claw 5h to extend further radially inwards in relation to the radial direction of the disc brake rotor 2 than the reacting claws 5g, 5g which are disposed at the rotating rotor exit side and the rotating rotor entrance side.

Therefore, the rigidity of the side of the caliper body 5 where the reacting portion 5b is provided can be ensured, and the friction pads 6, 6 can be pressed well by the three reacting claws 5g, 5g, 5h.

The inward piece 10f is formed so as to be gradually inclined radially outwards in relation to the radial direction of the disc brake rotor 2 from the portion facing the deep-side piece 10e towards the distal end portion 10g, and therefore, the lug piece 6b is pressed against the radially outward surface 3d of the pad guide groove 3c via the outboard piece 10d by the inward piece 10f, thereby restricting the looseness of the friction pad 6.

The distal end portions 5i of the reacting claws 5g, 5g which lie close to the inward pieces 10f, 10f are disposed further radially outwards in relation to the radial direction of the disc brake rotor 2 than the inward pieces 10f, and the spaces to which the indicators 11 are crimp fixed to the mounting pieces 6d, 6d and the projecting portions 6e, 6e can be ensured at the radially inward corner portions of the backing plate 6a which lie at the rotating disc exit side and the rotating rotor entrance side.

The friction pads 6 can be commonly used not only between the inboard and outboard sides but also between the left-wheel-side and right-wheel-side caliper bodies 5, thereby reducing projection costs.

The invention is not limited to the above-described embodiment described. For example, the invention can also be applied to a caliper body having one cylinder bore in an acting portion or a caliper body having three or more cylinder bores in the acting portion. In the invention, the mounting piece to which the indicator is mounted and the projecting portion to which the indicator is crimp fixed may be omitted.

The inward piece of the pad retainer may extend along the radially inward surface of the pad guide groove. The pad guide groove is not limited to the pad guide groove which is formed into the U-like shape. The pad guide groove may be a pad guide groove which includes no radially outward surface, and the pad retainer may be a pad retainer which includes no outward piece.

The invention claimed is:

1. A vehicle disc brake, comprising:
    a caliper body including
        an acting portion disposed on one side of a disc brake rotor, the acting portion having a cylinder bore in which a piston is accommodated,
        a reacting portion disposed on the other side of the disc brake rotor, the reacting portion having a plurality of reacting claws, and
        a bridge portion connecting the acting portion and the reacting portion;
    a caliper bracket to be fixedly connected to a vehicle body, the caliper bracket including
        a pair of caliper support arms disposed to stride over an outer edge of the disc brake rotor and to movably support the caliper body via slide pins in an axial direction of the disc brake rotor, and
        pad guide grooves provided individually on the caliper support arms so as to face each other, each pad guide groove including
            a confronting surface which confronts a confronting surface of the other pad guide groove and
            a radially inward surface projecting from an inward end of the confronting surface in a radial direction of the disc rotor in a direction which is at right angles to the confronting surface;
    a pair of friction pads disposed to hold the disc brake rotor therebetween and movably supported in the pad guide grooves, each friction pad including
        a backing plate, and
        lug pieces provided at both end portions of the backing plate; and
    pad retainers individually interposed between the friction pads and the pad guide grooves, each pad retainer including
        a pair of retainer portions including
            a deep-side piece disposed along the confronting surface and
            inward pieces extending inwards of the caliper body from an inward end portions of the deep-side pieces in the radial direction of the disc brake rotor, and
        a connecting piece which connects the retainer portions together,
    wherein lengths of the reacting claws which lie closest to the inward pieces are set so that distal end portions thereof are disposed further radially outwards in the radial direction of the disc brake rotor than the inward pieces, and
    wherein the distal end portions of the inward pieces are brought into abutment with the lug pieces in a position which lies further inwards of the caliper body than circumferential end faces of the reacting claws which lies closest to the inward pieces.

2. The vehicle disc brake of claim 1, further comprising a pair of mounting pieces formed at radially inward corner portions of the end portions of the backing plate in a rotating direction of the disc brake rotor so as to project therefrom while being inclined radially inwards in relation to the radial direction of the disc brake rotor.

3. The vehicle disc brake of claim 2,
    wherein radially outward surfaces of the lug pieces are brought into abutment with outward pieces of the retainer portions, and radially inward surfaces of the lug pieces are brought into abutment with the inward pieces.

4. The vehicle disc brake of claim 3,
    wherein distal end sides of the inward pieces are brought into abutment with the radially inward surfaces of the lug pieces to press the lug pieces against the radially outward surfaces of the pad guide grooves via the outward pieces.

5. The vehicle disc brake of claim 1,
    wherein the reacting claws comprise two reacting claws formed to have a length which enables the distal end portions thereof to be disposed further radially outwards in relation to the radial direction of the disc brake rotor than the inward pieces in such a state that the pad retainers and the friction pads are assembled to pad guide grooves.

6. The vehicle disc brake of claim 5,
wherein the reacting claws include another reacting claw disposed between cylinder bores and formed to have a length which enables the other reacting claw to extend further radially inwards in relation to the radial direction of the disc brake rotor than the two reacting claws which are disposed at a rotating rotor exit side and rotating rotor entrance side.

7. The vehicle disc brake of claim 5,
wherein a straight line L1 which connects the distal end portions is disposed further radially outwards in relation to the radial direction of the disc brake rotor than the inward pieces.

8. The vehicle disc brake of claim 1,
wherein the inward pieces of the pad retainer are formed to have a length which enables the distal end portions of the inward pieces to be brought into abutment with the lug pieces in a position which lies further inwards of the caliper body than circumferential end faces of the reacting claws, and
the distal end portions of the inward pieces are brought into abutment with the lug pieces in a position which lies further inwards of the caliper body than an extension L2 of a circumferential end face of the reacting claws.

9. The vehicle disc brake of claim 8,
wherein projecting portions to which indicators are crimp fixed are individually disposed further radially inwards in relation to the radial direction of the disc brake rotor than the distal end portions of the reacting claws, and
wherein the inward pieces are formed so as to be gradually inclined radially outwards in relation to the radial direction of the disc brake rotor from a portion facing a deep-side piece towards the distal end portion, and the lug pieces are pressed against the radially outward surface of the pad guide grooves via outboard pieces of the pad retainer, thereby restricting the looseness of the friction pad.

10. The vehicle disc brake of claim 9,
wherein distal end portions of two reacting claws which lie close to the inward pieces are disposed further radially outwards in relation to the radial direction of the disc brake rotor than the inward pieces, and
spaces to which the indicators are crimp fixed to mounting pieces and projecting portions are ensured at radially inward corner portions of the backing plate which lie at a rotating disc exit side and a rotating rotor entrance side.

11. The vehicle disc brake of claim 1,
wherein the retainer portions are installed in the pad guide grooves on both sides of the disc brake rotor at a rotating rotor entrance side or rotating rotor exit side,
wherein mounting pieces are brought into abutment with mounting surfaces of pad retainer mounting portions of the caliper support arms, and
a connecting piece stretches over an outer edge of the disc brake rotor to connect upper portions of the mounting pieces.

12. The vehicle disc brake of claim 11,
wherein the mounting pieces are elastically deformed by being bent back from a distal end portion of outward pieces along a distal end face of the pad retainer mounting portion and then allowed to extend in a direction of a radially outward surface of the pad retainer mounting portion.

13. The vehicle disc brake of claim 1,
wherein the pad guide groove is formed into a U-like shape and further includes an outward surface in the radial direction of the disc brake rotor,
wherein the retainer portion further includes an outward piece disposed along the outward surface, and
wherein the inward piece is inclined gradually radially outwards in the radial direction of the disc brake rotor from the deep-side piece towards a distal end portion thereof.

14. The vehicle disc brake of claim 1,
wherein the caliper body includes a plurality of cylinder bores as the cylinder bore, and
wherein the reacting claw that is disposed between the cylinder bores extends further radially inwards in the radial direction of the disc brake rotor than the reacting claws which lie closest to the inward pieces.

15. The vehicle disc brake of claim 1,
wherein the backing plates of the friction pads each includes projecting portions formed on both end portions the corresponding backing plate which are positioned radially inward in the radial direction of the disc brake rotor and circumferentially outward in a rotating direction of the disc brake rotor, and
wherein indicators configured to inform of a worn condition of the friction pads are crimp fixed to the projecting portions.

16. The vehicle disc brake of claim 1, further comprising vehicle body mounting arms provided individually at end portions of the acting portion in relation to a rotating direction of the disc brake rotor so as to project therefrom.

17. The vehicle disc brake of claim 1,
wherein the reacting claws comprise two reacting claws disposed respectively at a rotating rotor exit side of a first cylinder bore disposed on a rotating rotor exit side and at a rotating rotor entrance side of a second cylinder bore disposed on the rotating rotor entrance side, and a third reacting claw disposed between the first and second cylinder bores.

18. The vehicle disc brake of claim 1, wherein the lug pieces are formed substantially rectangular so as to be inserted into pad guide grooves, provided at both the end portions of the backing plate so as to project therefrom.

19. The vehicle disc brake of claim 1,
wherein the inward pieces have a length which enables them to project further inwards of the caliper body than the radially inward surface of the pad guide groove and is formed so that it is gradually inclined radially outwards in relation to the radial direction of the disc brake rotor from the end portion thereof which faces a deep-side piece towards a distal end portion.

20. The vehicle disc brake of claim 1,
wherein the pad retainer is installed in such a state that outward pieces of each retainer portion is in abutment with a radially outward surface of each pad guide groove and a proximal end portion of each inward piece is in abutment with a deep side of the radially inward surface of each pad guide groove.

* * * * *